United States Patent [19]
Sund

[11] Patent Number: 5,551,221
[45] Date of Patent: Sep. 3, 1996

[54] REPLACEABLE PICK-UP TOOTH ASSEMBLY FOR CROP PICK-UP

[76] Inventor: Lloyd P. Sund, HCT 2, Box 356, Newburg, N. Dak. 58762

[21] Appl. No.: 396,975

[22] Filed: Mar. 1, 1995

[51] Int. Cl.⁶ .................................................. A01D 57/12
[52] U.S. Cl. ............................... 56/400; 56/364; 460/122
[58] Field of Search ........................... 56/364, 126, 130, 56/400, 400.21; 460/121, 122

[56] References Cited

U.S. PATENT DOCUMENTS

| | | | |
|---|---|---|---|
| 2,869,657 | 1/1959 | Harrop | 172/710 |
| 2,909,889 | 10/1959 | Gustafson | 56/400 |
| 3,066,470 | 12/1962 | Johnston | 56/400 |
| 3,102,377 | 9/1963 | Garrett | 56/400 |
| 3,148,494 | 9/1964 | Scheidenhelm | 56/400 |
| 3,613,346 | 10/1971 | Hubbard | 56/400 |
| 4,459,797 | 7/1984 | Gessel et al. | 56/400 X |
| 4,481,758 | 11/1984 | Fishbaugh | 56/400 |
| 4,520,620 | 6/1985 | Gessel et al. | 56/400 |
| 4,901,511 | 2/1990 | Yarmashev et al. | 56/220 |
| 5,175,984 | 1/1993 | Hale et al. | 56/364 X |

*Primary Examiner*—Terry Lee Melius
*Attorney, Agent, or Firm*—Moore & Hansen

[57] ABSTRACT

A replaceable pick-up tooth assembly for a crop pick-up comprises a plurality of pick-up teeth integrally molded to and with a substantially C-shaped flexible mounting unit. The pick-up teeth have a greater height dimension in the direction of rotation of the raking pick-up, and taper in height dimension from a base end at the mounting unit and a tip opposite the base end. The thickness of the teeth in the lateral direction perpendicular to the direction of rotation is much smaller than the height dimension at the base end. This provides added strength in the direction of rotation yet permits flexibility in the lateral direction along the axis of rotation. The pick-up teeth rotate in a plane perpendicular to the axis of rotation and parallel to the direction of rotation, and are concave in the direction of rotation with a large radius of curvature to provide added efficiency and accuracy in pushing up crops. The C-shaped mounting unit snaps onto a mounting bar of a crop pick-up.

21 Claims, 1 Drawing Sheet

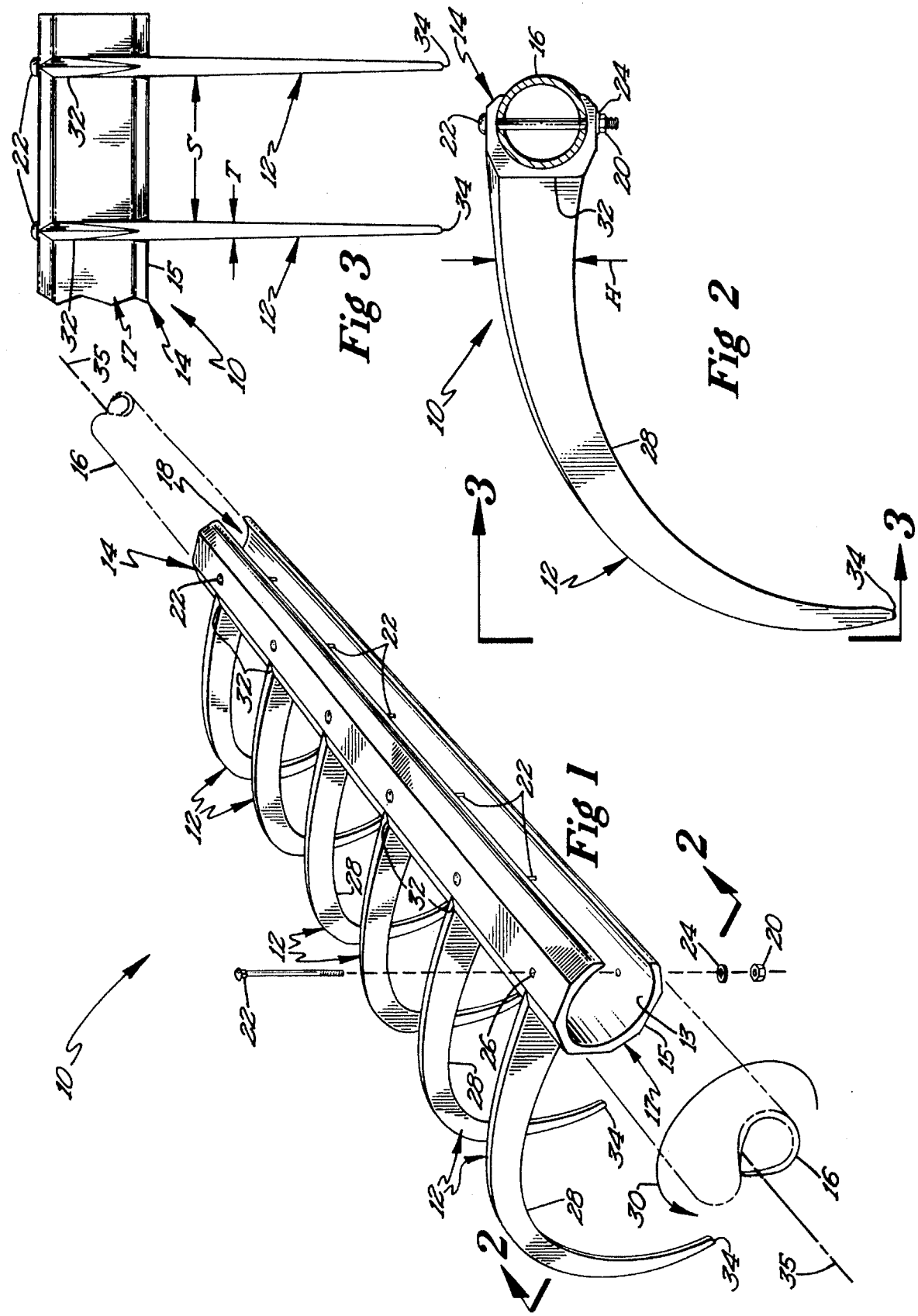

REPLACEABLE PICK-UP TOOTH ASSEMBLY FOR CROP PICK-UP

BACKGROUND OF THE INVENTION

The present invention relates generally to the field of crop pick-up teeth. Specifically, it relates to pick-up tooth assemblies for raking pick-ups.

Many designs exist for teeth used on pick-up reels, combine reels, and the like. Teeth or tines on combine reels, pick-up reels, and the like are used to assist in harvesting crops. Such teeth have many configurations. They are attached to combine or pick-up reels through a variety of mounting structures.

Presently, many pick-up teeth or tines are made of steel, with coils at the attachment point to a mounting bar. These coils require steel teeth to be spaced apart at intervals no closer together than 3 inches along the mounting bar. While this spacing may be effective for certain crop pick-up applications, a closer spacing is desirable for a number of other crop pick-up applications.

For an example of prior art, U.S. Pat. No. 4,901,511 (Yannashev et al.) discloses a tine with a cross-sectional configuration in the form of a triangle. Also, the cross section of the tine is wide and tapering along the axis of rotation of the reel, and thick but tapering in the direction of rotation of the harvester reel. The tine is mounted on a bat blade by means of a bolt or a hook and recess mounting. The tine has a slot longitudinally disposed. The slot is concave in the opposite direction of the rotation of the harvester reel. No multiple mounting of tines is done. Tines are mounted individually.

Another prior art tine is the stripper tooth used on crop pick-ups manufactured by the assignee to the fights of the present invention. These stripper teeth are strengthened in the direction of rotation of a crop pick-up, but do not move. They function only to separate the crop from the pick-up teeth.

U.S. Pat. No. 2,909,889 (Gustafson) discloses a mounting structure attachable to a bar with a bolt. The mounting structure has a semi-circular shape with a semi-circular liner. This mounting structure is preferably robber in order to absorb the shock of deflections of a tine around obstacles. The tine used in Gustafson is uniform in thickness throughout the direction of rotation. No disclosure or suggestion is made in Gustafson of multiply mounting a plurality of tines together on a mounting structure. No disclosure or suggestion is made of integrally forming the tines with the mounting structure. The tines are mounted to the structure using standard means. In Gustafson, the tines and mounting structure are completely separate.

Other tines in the art have various structures, such as being curved in the direction of rotation, but of uniform thickness (U.S. Pat. Nos. 3,102,377 to Garrett, 3,066,470 to Johnston, and 3,148,494 to Scheidenhehn).

Another prior an tine has protrusions extending along the axis of rotation of motion for a crop pick-up. The tine is typically secured to a mounting bar in engaging relation with similar tines. On of the protrusions has at its end a tab. Protrusion 44 has at its first end a tab and at its other end a slot. When two tines are mounted, the tab of one will engage the slot of another line to provide security against lateral displacement of tines. Such a set up requires a significant amount of replacement time simply to replace one tine, especially if the broken tine is at the middle of a mounting bar.

Still another prior art tine is slightly curved along the direction of rotation, but is thickened along the axis of rotation. This prior art tine is additionally secured against lateral motion by interlocking with similar tines in a notch and tab configuration. The notch at the distal end of one of the protrusions along the axis of rotation of the prior art tine engages the tab of a similar tine, the tab being at the distal end of the other protrusion along the axis of rotation. This configuration locks the tines into a specific lateral position along the mounting bar. However, a problem exists when a tine of this nature needs to be replaced. The interlocking nature of the tines requires at least loosening all tines from the end of the mounting bar to the broken tine in order to release the broken tine from the interlocking nature of its mounting. Such a configuration results in a large expenditure of time simply to replace one broken tine. Further, this tine is also thickened along the axis of rotation but not in the direction of rotation.

Prior art tines for combine reels or raking pick-ups are often uniform in cross section. Such designs present numerous problems. If the cross-sectional area is small for efficient raking or picking, and also for ease of passage through crops and around obstacles, the strength is compromised by using light material. However, strong material, such as steel, is costly and heavy. In order to provide proper strength with lightweight material, cross-sectional areas have grown and changed.

Prior an tines have been strengthened in the lateral direction, that is, along the axis of rotation, but left unfortified in the direction of rotation. For a raking pick-up, this form of tine is unacceptable because it cannot adequately flex laterally around rocks and other obstacles.

As mentioned, Yannashev et al. discloses a tine with a complex cross section that is somewhat strengthened in the direction of rotation. However, Yannashev et al. explicitly includes a slot meant to increase flexibility in the direction of rotation. Yannashev et al., also by its design strengthens in the lateral direction, which as mentioned is undesirable in raking pick-ups.

Raking pick-up teeth should be accurate in pick-up for higher efficiency, flexible but sturdy in lateral motion, and strong in the direction of rotation of the raking pick-up. No prior art of which the inventor is aware has extra tapering thickness in the direction of rotation only.

To the best of inventor's knowledge, prior art tines are universally mounted individually. Mounting schemes and plans range from the simple to the complex. The breakage of more than one tine at a time requires disassembly and replacement tine in direct proportion to the number of tines broken. Further, some mounting schemes have tines interlocking with one another requiring removal of up to half of the tines on a mounting bar just to replace one broken tine. No prior art of which the inventor is aware integrally molds the tines with the mounting unit, as in the present invention.

BRIEF SUMMARY OF THE INVENTION

It is an objective of the present invention to provide a structure for mounting a plurality of pick-up teeth to a mounting bar at one time.

It is a further objective of the present invention to integrally mold a plurality of raking pick-up teeth with a unique mounting structure.

It is another objective of the present invention to provide a lightweight yet strong tooth for a raking pick-up.

It is yet another objective of the present invention to provide a raking pick-up tooth flexible in the lateral direction yet strengthened in the direction of rotation.

It is still yet another objective of the present invention to provide a pick-up tooth capable of lateral spacing of approximately 1–2 inches. The present invention accomplishes these objectives by providing a plurality of pick-up teeth integrally molded with and mounted to a substantially C-shaped tubular mounting unit. The teeth and the tubular member are made from polypropylene. Carbon is added to the polypropylene to prevent ultraviolet light from breaking down the polypropylene. Each tooth is connected to the mounting unit at a base end, and has a greater height dimension in the plane within which each tooth rotates as the mounting unit and mounting bar rotate. The teeth taper in height dimension toward a tip opposite the base end. The teeth have a large radius of curvature concave in the direction of rotation in order to provide increased accuracy and strength. Further, the teeth are flexible in the lateral direction of motion so as to allow the teeth to flex around rocks or other obstacles in the path of the pick-up tooth assembly. The substantially C-shaped mounting unit or tubular member is mountable on a mounting bar by a deformable friction fit. The C-shaped mounting unit essentially snaps on to a mounting bar. Conventional fastening means may be used to further secure the mounting unit to the mounting bar.

The present invention overcomes the problems of prior art teeth in that it decreases the chances of tooth breakage while at the same time increasing the accuracy of pick-up and the ease, time, and cost of replacement. The polypropylene construction of the present invention allows it to be lightweight, yet strong and flexible.

The lateral spacing along the length of the mounting unit of the teeth of the present invention is not limited as are steel teeth. The present invention allows spacing of teeth along the mounting unit at a spacing of as close as one inch. This close spacing allows the present invention to be used for a wider variety of crop pick-up functions than steel tines, which are limited to a spacing of three inches or more.

These and other objects and benefits of the present invention will become apparent from the following detailed description thereof taken in conjunction with the accompanying drawings, wherein like reference numerals designate like elements throughout the several views.

DESCRIPTION OF THE DRAWINGS

FIG. 1 is a perspective view of an embodiment of the replaceable pick-up tooth assembly and a typical mounting bar;

FIG. 2 is an end elevation view of the pick-up tooth assembly of FIG. 1, taken along line 2—2 thereof; and FIG. 3 is a front elevational view of an embodiment of the replaceable pick-up tooth assembly of FIG. 1.

DESCRIPTION OF THE PREFERRED EMBODIMENT

Referring to FIG. 1, the replaceable pick-up tooth assembly 10 may be seen. The pick-up tooth assembly 10 as shown has six pick-up teeth 12 integrally molded to an elongated, substantially C-shaped mounting unit 14. Fewer or more teeth 12 could be molded to a mounting unit 14 as desired. Mounting unit 14 is substantially a tubular member, and is flexible to allow pick-up tooth assembly 10 to be mounted to a mounting bar 16 of a suitable crop pick-up by "snapping" the assembly 10 onto the mounting bar 16. Mounting unit 14 and teeth 12 are molded from polypropylene. The polypropylene allows the assembly to be flexible. The polypropylene has added carbon to help prevent its destruction by ultraviolet radiation present in light. Assembly 10, due to its sturdy yet lightweight construction, is economical to use and repair. Open portion 18 of mounting unit 14 snaps onto mounting bar 16 by a deformable friction fit engaging the mounting bar 16. The mounting unit open portion 18 fits partially over the mounting bar 16, and the flexibility of the polypropylene used to make the teeth and mounting unit allows the mounting unit 14 to form a friction fit with the mounting bar 16. The friction fits puts mounting unit 14 mounting bar 16 in embracing engagement, the mounting unit 14 substantially embracing the mounting bar 16. Further securing of assembly 10 to mounting bar 16 may be performed by conventional fastening means such as nuts 20, bolts 22 and washers 24. C-shaped mounting unit 14 is provided with fastening openings 26 for further fastening to mounting bar 16.

Interior 13 of mounting unit 14 is smooth and substantially cylindrical in order to closely fit the outer contour of a typical round mounting bar such as bar 16. Exterior 15 of mounting unit 14 is partially flattened in order to facilitate easy attachment of fastening means such as nuts 20, bolts 22, and washers 24.

Teeth 12 are in spaced apart relation along the mounting unit 14 and extend outwardly from closed portion 17 of mounting unit 14. The spacing S between consecutive teeth is variable, and dependent upon the type of crop on which the raking pick-up is operating. The spacing S between consecutive teeth can be as small as approximately 1 inch, with a range of between 1–2 inches. A spacing S of approximately 1⅛ inches is particularly effective for dense crops, or for crops large enough that a spacing S farther apart would prevent the pick-up from effectively picking the crop up. Such crops would include those that are detachable from the main plant, including for example vegetables and fruit.

Referring now to FIG. 3, pick-up teeth 12 are integrally molded to and with mounting unit 14. Teeth 12 rotate in a plane perpendicular to the axis of rotation 35 and parallel to the direction of rotation indicated by arrow 30. Pick-up teeth 12 also have a concavity 28 in the direction of rotation indicated by arrow 30. Each tooth 12 is attached to mounting unit 14 at a base end 32. The concavity 28 assists in effective pick-up of crops, helping to guide crops to a cutter or hopper for cutting or collection, respectively. The teeth have a height dimension H in the plane within which they rotate, and the dimension H tapers from its maximum at the base end 32 to its minimum at tip 34. Tip 34 and base end 32 are therefore at opposite ends of teeth 12. Thickness T of teeth 12 along the axis of rotation 35 of the assembly is uniform, and much smaller than the height dimension H at base end 32. Thickness dimension T and height dimension H are perpendicular.

Teeth 12 are integrally molded to and with flexible mounting unit 14 so that teeth 12 extend outwardly with their base ends 32 at closed portion 17 of mounting unit 14. Teeth 12 have a concave radius of curvature in the direction of rotation of the raking pick-up. The preferred radius of curvature of each tooth 12 is approximately 4 inches, but may be varied if a different radius is desired. The radius of curvature of teeth 12 is larger than that of prior art teeth. The reason for this is that the greater radius of curvature provides teeth 12 with greater accuracy in crop pick-ups. Especially in the area of raking pick-ups, a greater radius of curvature allows teeth 12 to more effectively push up grain or to collect crops.

Teeth 12 are strengthened in the direction of rotation 30 by the extra height in height dimension H, but are left with no extra fortification by thickness T along the axis of rotation 35 of the mounting bar 16. The thickness T of each tooth 12 remains substantially the same from base end 32 to tip 34. This is to afford the teeth 12 sufficient flexibility to be laterally displaced over and around rocks or other obstacles in the path of travel, yet still allow the teeth 12 to pick up crops. This lateral flexibility increases tooth longevity. The fortification of teeth 12 in the height dimension H allows the teeth to be used to pick up dense or wet crops, and also allows for the occasions in which the teeth 12 will be traveling through topsoil or earth during the raking motion of the tooth assembly 10.

The assembly 10 is easily removed frown mounting bar 16 and easily and quickly mounted thereto. Replacement of the assembly 10 is accomplished simply by removing the nuts 20, bolts 22 and washers 24, and snapping the assembly 10 from its friction fit mounting on mounting bar 16. A replacement assembly 10 may be placed back on mounting bar 16 with minimal time and effort. Since the teeth 12 and the C-shaped mounting unit 14 are molded from polypropylene, the replacement cost is not prohibitive. A new tooth assembly 10 may be placed on the mounting bar 16 by "snapping" it in place to the mounting bar. The friction fit plus the additional conventional fasteners securely hold the assembly in place for operation. The pick-up tooth assembly 10 has particular application to raking crop pick-ups, but its use on other types of crop pick-ups would be similar and is within the purview of the invention.

The detailed description outlined above is considered to be illustrative only of the principles of the invention. Numerous changes and modifications will occur to those skilled in the art, and there is no intention to restrict the scope of the invention to the detailed description. The preferred embodiments of the invention having been described in detail, the scope of the invention should be defined by the following claims.

What is claimed is:

1. A replaceable pick-up tooth assembly of unitary construction for a crop pick-up, said pick-up tooth assembly comprising:

an elongated, flexible mounting member having a plurality of pick-up teeth integrally formed therewith in spaced apart relation along the length of said mounting member, each of said teeth having a tip and an opposite base end integrally joined with said mounting member.

2. The pick-up tooth assembly of claim 1 wherein said pick-up teeth are concave in the direction of rotation of the pick-up.

3. The pick-up tooth assembly of claim 1 wherein said mounting member is substantially C-shaped in cross-section.

4. The pick-up tooth assembly of claim 3, wherein said mounting member is a tubular member.

5. The pick-up tooth assembly of claim 1 wherein:

said teeth have a greater height dimension in the plane within which each tooth rotates in comparison with the thickness of each tooth in a direction perpendicular to said height dimension.

6. The pick-up tooth assembly of claim 5 wherein said teeth taper to reduce the height dimension from a maximum at said base end to a minimum at said tip.

7. The pick-up tooth assembly of claim 1 wherein the radius of curvature of said teeth is approximately 4 inches.

8. The pick-up tooth assembly of claim 1 wherein said teeth are polypropylene.

9. The pick-up tooth assembly of claim 1, wherein the raking pick-up has a mounting bar, and said mounting member is mountable on the mounting bar by a deformable friction fit in embracing engagement therewith.

10. The pick-up tooth assembly of claim 9 wherein said mounting member is further mountable to the mounting bar by conventional fastening means.

11. The pick-up tooth assembly of claim 1 wherein the spacing between said teeth is within a range of between 1 and 2 inches.

12. A replaceable pick-up tooth assembly for a crop pick-up, said pick-up tooth assembly comprising:

a substantially C-shaped flexible mounting unit;

a plurality of pick-up teeth integrally molded to said mounting unit at spaced apart locations thereon;

each of said pick-up teeth having a tip and an opposite base end integrally joined with said mounting unit;

each of said teeth having a greater height dimension in the plane within which each tooth rotates in comparison with the thickness dimension of each tooth in a direction perpendicular to said height dimension; and said pick-up teeth being concave in the direction of rotation of the pick-up.

13. The pick-up tooth assembly of claim 12 wherein said teeth taper to reduce the height dimension from a maximum at said base end to a minimum at said tip.

14. The pick-up tooth assembly of claim 12 wherein the pick-up has a mounting bar, and said mounting unit is mountable on the mounting bar by a deformable friction fit in embracing engagement therewith.

15. The pick-up tooth assembly of claim 14 wherein said mounting unit is further mountable to the mounting bar by conventional fastening means.

16. The pick-up tooth assembly of claim 12 wherein the spacing between said teeth is within a range of between 1 and 2 inches.

17. A replaceable pick-up tooth assembly for a crop pick-up having a mounting bar, said pick-up tooth assembly comprising:

a substantially C-shaped flexible mounting unit of a predetermined length;

a plurality of pick-up teeth integrally molded to said mounting unit at spaced apart locations along said length, and extending outwardly therefrom;

said pick-up teeth having a greater height dimension in the direction of rotation of the pick-up than a thickness dimension perpendicular to said height dimension: and said mounting unit mountable on the mounting bar by a deformable friction fit in embracing engagement therewith.

18. The pick-up tooth assembly of claim 17 wherein said mounting unit is further mountable to the mounting bar by conventional fastening means.

19. The pick-up tooth assembly of claim 17 wherein the spacing between said teeth is within a range of between 1 and 2 inches.

20. The pick-up tooth assembly of claim 17 wherein said teeth taper to reduce the height dimension from a maximum at said base end to a minimum at said tip.

21. The pick-up tooth assembly of claim 1, wherein said base end has spaced apart segments formed around the external surface of said mounting member.

* * * * *

UNITED STATES PATENT AND TRADEMARK OFFICE
CERTIFICATE OF CORRECTION

PATENT NO. : 5,551,221
DATED : 09/03/96
INVENTOR(S) : Lloyd P. Sund

It is certified that error appears in the above-indentified patent and that said Letters Patent is hereby corrected as shown below:

1. In the BACKGROUND OF THE INVENTION, Column 1, line 34, after the words "assignee to the", delete "fights" and substitute --rights-- therefor.

2. In the BACKGROUND OF THE INVENTION, Column 1, line 42, after the word "preferably", delete "robber" and substitute --rubber-- therefor.

3. In the BACKGROUND OF THE INVENTION, Column 1, line 63, after the word "another" delete "line" and substitute --tine-- therefor.

Signed and Sealed this

Seventh Day of April, 1998

*Attest:*

BRUCE LEHMAN

*Attesting Officer*    Commissioner of Patents and Trademarks